United States Patent [19]

Anderson et al.

[11] Patent Number: 5,194,200

[45] Date of Patent: Mar. 16, 1993

[54] METHOD OF CREATING SILICA CERAMIC MEMBRANES

[75] Inventors: Marc A. Anderson; Lixin Chu, both of Madison, Wis.

[73] Assignee: Wisconsin Alumni Research Foundation, Madison, Wis.

[21] Appl. No.: 773,058

[22] Filed: Oct. 8, 1991

[51] Int. Cl.$^5$ .................. C04B 33/32; C04B 35/46
[52] U.S. Cl. ............................. 264/56; 210/510.1
[58] Field of Search ............... 264/56, 41; 501/12; 210/510.1

[56] References Cited

U.S. PATENT DOCUMENTS 5,006,248 4/1991 Anderson et al. .

FOREIGN PATENT DOCUMENTS

PCT/US88/-
02537 2/1989 PCT Int'l Appl. .

OTHER PUBLICATIONS

Anderson, et al., *J. Memb. Sci.*, 39: 243-258 (1988).

Asaeda, et al., *Jour. of Chem. Eng. of Japan*, 19[1]: 72-77 (1986).
Badley, et al., *Langmuir*, 6: 792-801 (1990).
Brinker, et al., *Solids*, 48:47 (1982).
Chen, K. C., et al., "Sol-Gel Processing of Silica: I. The Role of the Starting Compounds," *J. Non-Crystalline Solids* 81: 227-237 (1986).
Johnson, D. W., "Sol-Gel Processing of Ceramics and Glass," *Am. Ceram. Soc. Bull.* 64[12]: 1597-1602 (1985).
Shafer, et al., *J. Appl. Phys.*, 61:5438 (1987).
Stober, et al., *J. Colloid Interface Sci.*, 26:62 (1968).
Van Helden, et al., *J. Colloid Interface Sci.* 81:354 (1981).

*Primary Examiner*—Frank Sever
*Attorney, Agent, or Firm*—Quarles & Brady

[57] ABSTRACT

A method of creating a silica ceramic membrane is disclosed. The method begins with the hydrolyzing of a silicon alkoxide with ammonia until the sol is formed. The sol is dialyzed to approximately pH 8 and then acidified to approximately pH 3. The sol is then formed into a membrane by controlled evaporation followed by sintering.

21 Claims, No Drawings

METHOD OF CREATING SILICA CERAMIC MEMBRANES

FIELD OF THE INVENTION

The present invention relates to the field of ceramic membranes. In particular, the present invention relates to the field of metal oxide ceramic membranes with small pore size.

BACKGROUND

Ceramic membranes have a variety of industrial and scientific uses, the most common of which is use in separation processes. Organic membranes are often currently used in industry for separation processes, but ceramic membranes offer several advantages over organic membranes. Ceramic membranes are more resistant than organic membranes to organic solvents, chlorine, and, in some cases, extremes of pH. Ceramic membranes are also inherently more stable at high temperatures, thus allowing more efficient sterilization of process equipment than is possible with organic membranes. Ceramic membranes are generally quite resistant to microbial or biological degradation, which can occasionally be a problem with organic membranes. Ceramic membranes are also more mechanically stable under high pressures.

The mechanism of operation and types of separations which can be achieved by ceramic membranes are discussed in general by Asaeda et al., Jour. of Chem. Eng. of Japan, 19[1]: 72-77 (1986). At least one line of ceramic filters is currently marketed under the trade name "Ceraflo" by the Norton Company of Worcester, Mass. Alcoa Corporation of Pittsburgh, Pa. also markets ceramic filters made by slip-cast processing.

Ceramic membranes may be formed in particulate or polymeric manners. Anderson, et al., J. Memb. Sci 39: 243-258 (1988), describes different methods of making both particulate and polymeric sols from transition metal oxides. In general, particulate membranes have a smaller average pore diameter and a narrower pore size distribution as compared to polymeric membranes.

Particulate ceramic membranes are typically formed through a process beginning with organic-inorganic molecules. The molecules are formed into small metal oxide clusters which in turn aggregate to form metal oxide particles. The particles are fused into a unitary ceramic material. The gaps between the fused particles form a series of pores in the membrane.

The creation of these metal oxide ceramic membranes is generally conducted through a sol-gel procedure. Usually, the metal oxide is initiated into the process as a metal alkoxide solution. The metal is hydrolyzed to metal hydroxide monomers, clusters or particles, depending on the quantity of solvent used. The insoluble metal oxide particles are then peptized by the addition of an acid which causes the particles of the metal oxide to have a greater tendency to remain in suspension, presumably due to charges acquired by the particles during the peptizing process.

Such a sol can be evaporated to form a gel, which is a semi-solid material. Further evaporation, and then sintering, of the gel results in a durable rigid material which can either be formed as an unsupported membrane or as a supported membrane coated onto a substrate. This substrate can be either porous or non-porous and either metallic or non-metallic, depending on the particular application.

Two current limitations on the use of ceramic membranes are the materials used to fabricate the membranes and the membrane pore size and range. With regard to the composition of the membranes, ceramic membranes have been created using many materials. For example, Leenaars et al., Jour. of Membrane Science, 24: 261-270 (1985), report the use of the sol-gel procedure to prepare supported and unsupported alumina membranes. Ceramic membranes composed of titanium, zirconium and other metals have also been reported.

Silica represents an additional very advantageous element for use in ceramic membranes. Many workers have reported silica gels made by the hydrolysis and condensation of alkoxide starting materials. In previous methods of producing silica gels, acid-catalyzed hydrolysis lead to sols containing weakly-branched polymers and products having smaller pores while base-catalyzed hydrolysis lead to sols containing particles and products with larger pores. (Brinker, et al., Solids 48:47 (1982); Shafer, et al., J. Appl. Phys. 61:5438 (1987). Particulate silica gels have been prepared by hydrolysis of tetraethyl orthosilicate (TEOS) in a solution of water, ammonia and ethanol. The solution is usually stirred for a period of time until the silica particles form a colloidal sol. For example, Badley, et al., Langmuir 6: 792-801 (1990), have prepared monodispersive colloidal silica particles of 50-700 nm.

Ceramic membranes formed of transition metal oxides have been reported with pore sizes of 5 to 40 Angstroms. Anderson et al., U.S. Pat. No. 5,006,248 discloses aluminum ceramic membranes with small pore size. There has been one report of silica membranes with pore sizes under 50 Angstroms. Mary Gieselmann, University of Wisconsin, Water Chemistry Program, has synthesized silica gels and membranes by adapting the TEOS/ammonia/ethanol technique in light of Stober, et al., J. Colloid Interface Sci. 26:62 (1968), and Van Helden, et al., J. Colloid Interface Sci. 81:354 (1981). These silica membranes had an average pore diameter as low as 40 Angstroms (Gieselmann, personal communication).

Gieselmann's disclosure does not satisfy the need for a method of preparing micropore silica membranes. A disadvantage of Gieselmann's method is that the TEOS-/ethanol/ammonia solution had to be stirred for one week before a sol formed. Also, the method relied on extreme dilutions to prevent particle aggregation, thus requiring large amounts of solvent. Additionally, there are many applications in which a membrane with pore size less than 20 Angstroms is needed. For example, for ultrafiltration, reverse osmosis, and gas separation.

What is needed in the art of ceramic membranes is an improved method of creating silica membranes with small pore size.

SUMMARY OF THE INVENTION

The present invention is a method of creating a silica ceramic membrane. The method begins with the hydrolyzing of a silicon alkoxide with ammonia until a sol is formed. The sol is dialyzed to approximately pH 8 and then acidified to approximately pH 3. The sol is then formed into a membrane. In one embodiment of the present invention, the unsupported sol is sintered until a membrane is formed. In another embodiment of the invention, the sol is coated onto a solid support and evaporated until a membrane is formed.

The present invention is also the membrane product produced by the process described above. In one embodiment, membranes of the present invention have an average pore diameter of less than 20 Angstroms.

An object of the present invention is to provide an improved method of creating silica ceramic membranes formed of very small particles of a highly uniform size.

An advantage of the present invention is that porous silica ceramic membranes with pore sizes smaller than previously obtained can be created.

Other objects, advantages and features of the present invention will become apparent from the following specification and claims.

DETAILED DESCRIPTION OF THE INVENTION

1. In General

The method requires the initial hydrolysis of a silicon alkoxide, such as TEOS, under conditions that ensure the dissolution of the products and the formation of a solution of dissolved silicon ions. Controlled precipitation of the silicon dioxide is obtained by placing the solution of silicon ions in a dialysis bag and dialyzing against distilled water. The dialysis is intended to remove excess ammonia, to lower the pH of the solution, and to remove excess alcohol. As the pH slowly lowers in the dialysis bag, the solubility limit for the silicon oxide (silica) will be exceeded and precipitation of the particles will begin. These ultrafine particles will develop a large surface charge since the sol will still be basic (about pH 8) and the isoelectric point of $SiO_2$ is near a pH of 2.0. If this surface charge is high enough and the ionic strength of the system is below the critical coagulation concentration for the particles, these nanoparticles will form a stable sol. In order for this process to produce nanoparticles, the pH and ionic strength of the sol must be tightly controlled. The sol created in this fashion can be dried and sintered to produce a stable silica ceramic membrane.

The method described here is particularly useful for creating sols formed of very small particles. When these sols are dried and sintered, porous ceramic membranes are created which have pores of both a very small mean size and a narrow distribution of pore sizes. Such membranes have utility in a wide array of applications involving separations, such as ultrafiltration and reverse osmosis. In addition, pores and particles in this size range display unusual properties of interaction with light, because the particles and pores are small in relation to the wavelength of light, thus giving rise to so-called quantum effect and the reference Q-size particles for such particles. This method permits the creation of silica membranes with pore sizes less than 20 Angstroms in diameter, and down as far as 5 Angstroms in diameter, while retaining porosity and large surface area. Porosities above 30% and surface areas in the range of 200 to 600 $m^2$/gram are obtainable.

2. Basic Hydrolysis

The method of the present invention begins with hydrolyzing of a silicon alkoxide with ammonia until a sol is formed. A preferable alkoxide for use in the present invention is tetraethyl orthosilicate or TEOS. Another suitable alkoxide is tetramethyl orthosilicate (TMOS). A preferable ammonia concentration is 5 ml of concentrated ammonium hydroxide mixed with 150 ml $H_2O$ and 22.5 ml TEOS. The concentration of silica in the sol is quite important to the pore size of the resulting membrane. Small particles, referred to as nanoparticles, have been obtained with an approximately 0.5M sol, but other concentrations of silica might be useful when silica membranes with other pore sizes are desired.

We envision that silica may be mixed with various metals to form a membrane by the method of the present invention. ;: particularly advantageous mix would be silica and aluminum. Silica and aluminum together in a single membrane would produce membranes that are similar to natural and artificial zeolites. Zeolites are useful as a catalyst, absorbent, and filtering material.

Mixing TEOS and ammonium hydroxide will create a diphasic solution. The diphasic system is mixed, preferably either by stirring or shaking. A stable sol forms once the diphasic solution disappears. This is typically after about 1 hour. The pH of this sol is between 8 and 12, depending on the initial ammonia concentration employed for hydrolysis.

3. Dialysis of the Sol

This neatly created sol is dialyzed to a pH of about 8. The sol is placed inside a dialysis membrane, preferably with a molecular weight cut-off of 3500. This pore size was used because it was the smallest pore size available at the time. After dialysis, the sol is typically filtered through a regular paper filter to remove contaminants. Centrifugation may also be used for this purpose.

The next step is to acidify the sol to approximately pH 3. Preferably, concentrated nitric acid may be used, although in theory other acids could be used. A preferable concentration of nitric acid is 30 microliters of concentrated acid to 20 ml of sol.

After the sol is acidified, it ages relatively rapidly. Consequently, a sol is prepared through the filtering step and then stored at that stage for future use. When it is time to prepare the membranes, the sol is acidified, and then aged approximately 24 hours. We have successfully prepared membranes from sols aged for up to seven days. After this aging period, membranes may be prepared from the sol.

4. Membrane Preparation

Membranes are prepared from the sols by sintering the resulting xerogel in an oven after allowing the sol to evaporate naturally into a xerogel. To create the xerogel from the aged sol, the remaining solvent (i.e. water or alcohol) must be removed. This is most conveniently done by controlled evaporation, typically done slowly over a period of at least 48 hours. The rate of evaporation is controlled by placing the sols in a controlled humidity environment.

Unsupported silica membranes may be fabricated from the sol at a variety of firing temperatures as indicated in the examples. Unsupported membranes are formed by pouring the sol into a plastic container and evaporating the sol to dryness. The dried membrane is then fired in an oven. Supported membranes are typically prepared by spin-coating or dip-coating a support with the sol and allowing controlled evaporation.

Typically, these dried sols are fired in an oven with a 2° C./minute ramp rate and a one hour dwell time. We have found that high firing temperatures gave lower surface area for the membranes, although this behavior is variable. Firing temperatures up to 500° C. still yield membranes with pore sizes in the less than 20 Angstrom range.

EXAMPLE

Tetra-ethyl orthosilicate (TEOS) was hydrolyzed with an ammonia solution. We mixed 150 ml $H_2O$, 5 ml concentrated ammonium hydroxide, and 22.5 ml TEOS to form an approximately 0.5M sol. The diphasic solution created by the mixture of TEOS and ammonia was mixed by stirring. A stable sol formed once the diphasic solution disappeared, after approximately 1 hour.

The sol was dialyzed to approximately pH 8, using a dialysis membrane with a molecular size limit of 3500. A smaller molecular cut-off membrane (1000 MW) has also been successfully used. The sol was placed in the dialysis membrane and dialyzed against distilled water. Dialysis was complete after approximately 24 hours.

After dialysis was completed, the sol was filtered through a filter paper. The sol was acidified to pH 3 by adding approximately 30 microliters of concentrated nitric acid to 20 ml of sol. The resulting sols were not stable over long periods of time, and the sol gradually turned white when allowed to sit.

To prepare unsupported membranes, the dried sols were fired at temperature between 200° C. and 500° C. (2° C./minute ramp rate; 1 hour dwell time). One set of sols (aged 24 hours) was divided into four subsets to be fired at different temperatures. Each of these membranes showed pores of approximately 11 Angstroms in diameter when measured by $N_2$ adsorption-desorption. As table 1 indicates, we found that higher firing temperatures gave lowered surface areas for the membranes. The surface area of the resultant membranes was measured by BET. The surface area data was as follows:

TABLE 1

| Firing Temperature | Specific Surface Area |
|---|---|
| 200° C. | 460 m$^2$/g |
| 300° C. | 492 m$^2$/g |
| 400° C. | 302 m$^2$/g |
| 500° C. | 242 m$^2$/g |

We also analyzed four silica membranes from sols aged for four different periods. Membranes were made from sols either immediately or after 1 day, 4 days or 7 days of aging. We analyzed these four membranes by $N_2$ adsorption-desorption. The pore radii for membranes prepared from the two sols aged the least amount were too small to be accurately determined but are believed to be less than 8 Angstroms in diameter. Pore radii for the other two membranes were larger, approximately 16 Angstroms for the 4 day-old sol and approximately 18 Angstroms for the 7 day-old sol.

Supported silica membranes have been prepared. Asahi glass disks (50 Angstroms pore size) were coated with a 0.5M silica sol at pH 3. The disk was etched with 10% HF; 10% $HNO_3$ for one minute before coating and was spun coated with one to two drop of sol at 1000 rpm for 60 seconds. The coated disk was dried at room temperature for one month in a box with uncontrolled humidity.

Asahi disks were also coated in a slightly different way. The disk was broken into smaller pieces, four of which were coated. The surface of the disk was covered with distilled water. The disks were spun for 1 minute at 2000 rpms to impregnate the disk with water. The surface to the disk as covered with sol and the disk was spun at 2000 rpm for 30 seconds. The coated disk was placed in a constant humidity box as quickly as possible and dried at room temperature for two days.

We claim:

1. A method comprising creating a ceramic silica membrane with a range of porosity as low as less than 20 Angstroms by:
   (a) hydrolyzing a silicon alkoxide with ammonia until a sol is formed;
   (b) dialyzing the sol to a basic solution;
   (c) acidifying the sol to below a pH of 7
   (d) forming a xerogel by solvent evaporation in a controlled humidity environment; and
   (e) sintering the xerogel until a membrane is formed.

2. The method of claim 1 wherein the silicon alkoxide of step (a) is tetra-ethyl orthosilicate.

3. The method of claim 1 additionally comprising after step (b) and before step (c) the step of filtering the dialyzed sol.

4. The method of claim 3 wherein the filtering through filter paper.

5. The method of claim 1 wherein the acidifying of step (c) is performed by adding concentrated nitric acid.

6. The method of claim 1 wherein the sintering of step (d) is between 200° C. and 500° C.

7. The method of claim 1 wherein the xerogel of step (d) is subjected to the sintering of step (e) after approximately 48 hours.

8. The method of claim 1 wherein in step (b), the sol is dialyzed until its pH reaches at least about 8.

9. The method of claim 1 wherein in step (c), the sol is acidified until its pH is about 3.

10. A ceramic membrane formed by the process of claim 1.

11. The membrane of claim 10 wherein the pores have an average diameter less than 20 Angstroms.

12. A method comprising creating a ceramic silica membrane with a range of porosity as low as less than 20 Angstroms by:
   (a) hydrolyzing a silicon alkoxide with ammonia until a sol is formed;
   (b) dialyzing the sol to a basic pH;
   (c) acidifying the sol to a pH less than 7;
   (d) coating the sol onto a solid support; and
   (e) allowing the sol to evaporate until a membrane is framed.

13. The method of claim 12 wherein the silicon alkoxide of step (a) is tetra-ethyl orthosilicate.

14. The method of claim 12 additionally comprising after step (b) and before step (c) filtering the dialyzed sol.

15. The method of claim 12 wherein the filtering is through filter paper.

16. The method of claim 12 wherein the acidifying of step (c) is performed by adding concentrated nitric acid.

17. The method of claim 12 wherein the acidified sol of step (c) is immediately subjected to the coating of step (d).

18. The method of claim 12 wherein the dialyzing step (b) is performed until the pH is about 8.

19. The method of claim 12 wherein the acidifying step (c) is performed until the pH is about 3.

20. A ceramic membrane formed by the process of claim 12.

21. The ceramic membrane of claim 20 wherein the average pore size is less than 20 Angstroms in diameter.

* * * * *